United States Patent Office 3,362,133
Patented Jan. 9, 1968

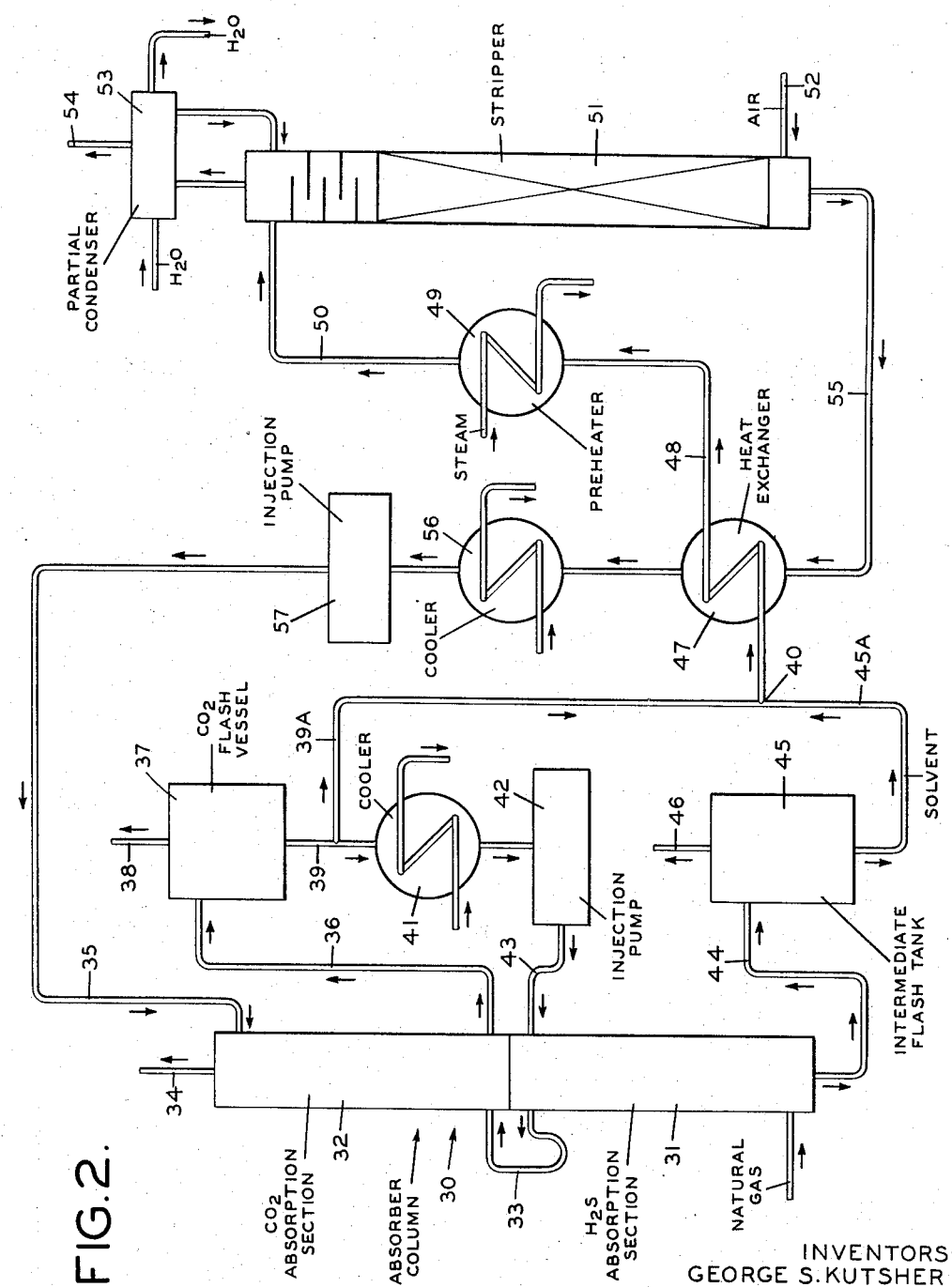

3,362,133
PROCESS FOR HYDROGEN SULFIDE REMOVAL FROM GAS MIXTURES CONTAINING H₂S AND CO₂
George S. Kutsher, Petersburg, and Glenn A. Smith, Jr., Colonial Heights, Va., assignors to Allied Chemical Corporation, New York, N.Y., a corporation of New York
Filed Aug. 15, 1966, Ser. No. 572,460
9 Claims. (Cl. 55—44)

ABSTRACT OF THE DISCLOSURE

A process for treating and separating hydrogen sulfide and carbon dioxide from gaseous mixtures containing same. The process involves the use of a solvent comprising a dialkyl ether of a polyethylene glycol under conditions that permit preferential absorption of the hydrogen sulfide.

---

Figure 1:
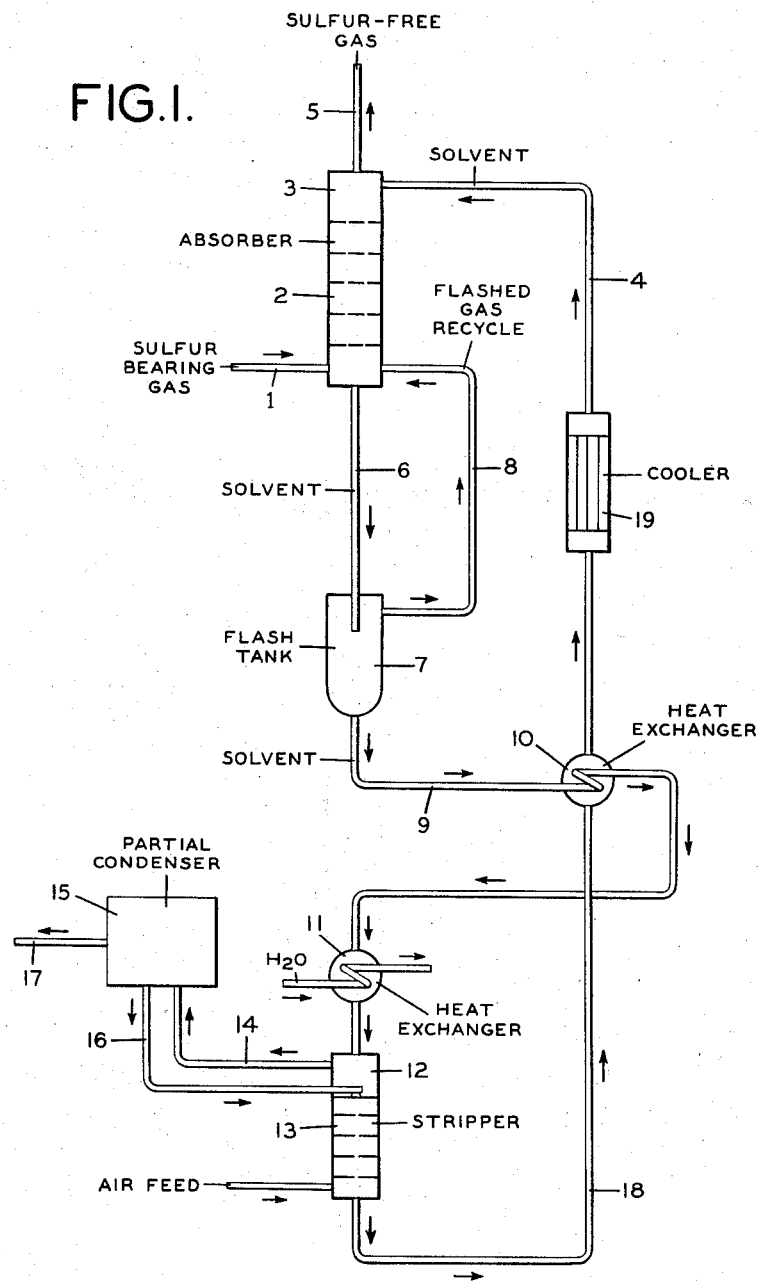

This invention relates to a process for removing hydrogen sulfide from gas mixtures containing hydrogen sulfide and carbon dioxide. More particularly, the invention relates to a process for treating sour natural gas containing hydrogen sulfide and carbon dioxide to selectively remove the hydrogen sulfide.

Mixtures of hydrogen with other gases, such as carbon dioxide and methane, are found in a number of industries. For example, mixtures of hydrogen sulfide, carbon dioxide, water, and methane are found as natural gases. It is frequently necessary to remove $H_2S$ from gas mixtures for the purpose of purifying the gas mixture or recovering the $H_2S$ or both. For example, it is often necessary to purify a gaseous hydrocarbon stream to produce sweet, dry gas which will not poison certain catalysts and will meet the usual pipeline specifications, and it is sometimes advantageous to recover the $H_2S$ as a source of elemental sulfur. Furthermore, in the treatment of gas mixtures containing both $H_2S$ and $CO_2$ the removal of $H_2S$ facilitates the subsequent recovery of pure $CO_2$. In such processes it is frequently advantageous to selectively separate the $H_2S$ from the other gases comprising the mixture, thus making possible the use of smaller capacity equipment for the removal and subsequent treatment of the separated gas. In particular, in the separation of $H_2S$ from sour natural gas, economies can be realized by selectively removing the $H_2S$ with as little as possible of the carbon dioxide.

It has been proposed in U.S. application 505,151, filed Oct. 25, 1965, to remove hydrogen sulfide from gas mixtures by a process which comprises absorbing hydrogen sulfide in a dialkyl ether of a polyalkylene glycol and stripping the hydrogen sulfide from the glycol ether solvent with an oxygen-containing gas. However, separation of hydrogen sulfide from gas mixtures containing hydrogen sulfide and carbon dioxide involves a particular problem because carbon dioxide is also soluble in the solvent, as taught in U.S. Patent 2,649,166. Also, the relatively low temperature of 100° F. or below, at which the solution of hydrogen sulfide is stripped, limits the amount of hydrogen sulfide that can be economically removed from the treated solvent. Since stripped solvent is recycled to the absorption step, it should be extremely low in hydrogen sulfide content if the treated gases are to contain little or no hydrogen sulfide.

In view of the foregoing, it is an object of this invention to provide an improved process for the removal of hydrogen sulfide from gaseous mixtures containing $H_2S$ and $CO_2$. A further object of the invention is to provide a simple and efficient method for the selective separation of $H_2S$ from sour natural gas mixtures containing $H_2S$ and $CO_2$. These and other objects and advantages which will be hereinafter obvious are achieved by the process of the present invention set forth in the following description wherein parts and percentages are by weight and temperatures are in degrees Fahrenheit, unless otherwise specified.

We have now discovered an improved procedure whereby hydrogen sulfide may be effectively and selectively removed from gas mixtures containing both $H_2S$ and $CO_2$. Furthermore, by operating in accordance with the procedure, hydrogen sulfide may be removed from sour natural gas mixtures so effectively that the residual natural gas is essentially free of hydrogen sulfide.

In accordance with this invention, the process comprises:

(a) Contacting a gaseous mixture containing hydrogen sulfide and carbon dioxide in a first zone with 0.1 to 1.8 pounds of a liquid solvent per standard cubic foot of hydrogen sulfide to be absorbed, the liquid solvent comprising a normally liquid dialkyl ether of a polyalkylene glycol, to effect absorption of substantially all of the $H_2S$ and a minor portion of other gases;

(b) Passing the solvent containing the absorbed hydrogen sulfide to a second zone maintained at a pressure substantially lower than that in the absorption zone to effect liberation of the other gases;

(c) Withdrawing from said second zone gases liberated therein;

(d) Withdrawing solvent containing $H_2S$ from said second zone;

(e) Passing an oxygen-containing gas in contact with the solvent in a stripping zone, which is maintained under conditions such that the solvent will be at least 104° F. when it reaches the base of the stripping zone, to effect removal of substantially all of the hydrogen sulfide therefrom;

(f) Returning desorbed solvent to the absorption zone for further contact with the gaseous mixture. Preferably, gas desorbed in the second zone is recycled to the first zone for further treatment.

The process can be operated to selectively separate hydrogen sulfide from the gaseous mixture leaving less than 1 p.p.m. by volume $H_2S$ in the gaseous mixture. In one embodiment of the process, hydrogen sulfide and carbon dioxide are separately recovered from a hydrocarbon gas. The selective nature of the process is unexpected in that both hydrogen sulfide and carbon dioxide are acidic gases and are usually treated alike in solvent processes.

Any dialkyl ether of a polyalkylene glycol that is normally a liquid and remains so under the conditions of operation can be utilized as the ether component of the solvent. Advantageously the liquid glycol ether comprises a dimethyl ether of a polyethylene glycol. Illustrative of specific compounds are the dimethyl ether of diethylene glycol, the dimethyl ether of triethylene glycol, the dimethyl ether of tetraethylene glycol, the dimethyl ether of pentaethylene glycol, the dimethyl ether of hexaethylene glycol, and the dimethyl ether of heptaethylene glycol. While these six polyethylene glycol ethers may be used individually or in admixture with one another, and the dimethyl ether of tetraethylene glycol is preferably used, it has been found that a mixture of all six of such polyethylene glycol ethers is generally as effective for all practical purposes. For convenience, this mixture of dimethyl ethers of polyethylene glycol is hereinafter designated as DMPEG.

The relatively large capacity of polyalkylene glycol ether compounds to absorb hydrogen sulfide is indicated in the following table which compares DMPEG with four solvents commonly used in gas purification:

| | Temp., °F. | Solubility, cc. $H_2S$ (STP)/cc. Solvent | | |
|---|---|---|---|---|
| | | 5 p.s.i.g. | 25 p.s.i.g. | 50 p.s.i.g. |
| Water | ca. 75 | 1.5 | 3.0 | 4.5 |
| Sulfolane | ca. 75 | 11.5 | 21.7 | 37.4 |
| Sulfinol Solvent | ca. 75 | 37.4 | 55.3 | 79.2 |
| Aqueous 20% monoethanol amine | ca. 75 | 65.8 | 70.3 | 72.5 |
| DMPEG | 80 | 24.7 | 52.9 | 90.8 |
| DMPEG | 40 | 59.3 | 138.8 | 362.8 |
| DMPEG | 10 | 159.4 | 362.0 | 1,471.0 |

An essential factor in the selective absorption of $H_2S$ is the solvent/gas ratio during absorption. For normal operation of this process this ratio should be in the range 0.1 to 1.8 pounds of solvent per standard cubic foot (s.c.f) of $H_2S$ to be absorbed. Less than this amount of solvent will not effectively remove $H_2S$, whereas larger amounts result in absorption of substantial amounts of other gases, particularly carbon dioxide in addition to the $H_2S$. It was found, for example, that with 26 p.s.i.a. $CO_2$ partial pressure and 26 p.s.i.a. $H_2S$ partial pressure in a feed gas, about 9% of $CO_2$ in feed was absorbed at a solvent/gas ratio of 1.5 pounds solvent per s.c.f. of acid gas absorbed. When solvent rate was increased to 5.8 pounds solvent per s.c.f. of acid gas absorbed, 94% of $CO_2$ in feed gas was absorbed.

Selective absorption of hydrogen sulfide may be obtained over a wide range of $H_2S$ partial pressures, for example, from 5 to 500 p.s.i.a.

Contact of the gaseous mixture with the polyalkylene glycol dialkyl ether solvent may be effected at any desired pressure. As a practical matter, however, the gaseous mixture is contacted with the solvent at a superatmospheric pressure sufficiently high to obtain a substantial degree of solution in the glycol ether solvent of the hydrogen sulfide present in such gaseous mixture. The degree of solution of the $H_2S$ in such glycol ether component increases, of course, as the pressure is increased; however, pressure in the absorption zone may be in the range 15 to 1500 p.s.i.a.

The temperature at which the gaseous mixture is contacted with the present solvent is not critical. Since the hydrogen sulfide constituent of the gaseous mixture dissolves in the glycol ether component of the solvent to a greater extent as the temperature is lowered, it will be appreciated that as low a temperature should be used as is compatible with the overall economical operation of the present procedure. By way of example only, a temperature of 0° to 125° F. can be used.

Following its withdrawal from the absorber, the solvent containing absorbed gas is passed to a flash tank maintained at a pressure intermediate between that in the absorption column and that in the stripping column, usually 15 to 500 p.s.i.a., for separation of carbon dioxide and other absorber feed gas components from the solvent, so that the absorbed hydrogen sulfide can be recovered in the stripping column in a relatively pure state.

In order to obtain the full advantages of the present invention the stripping gas should contain sufficient oxygen so that the ratio of stripping gas to solvent need not exceed about 1.0 s.c.f. gas per pound of solvent.

It is important that the solvent contain less than 0.001% $H_2S$ before it is recycled to the absorber, in order to assure effective absorption of $H_2S$ from the absorber feed gas using the low solvent/feed gas ratio prescribed above. This is accomplished by stripping the solvent with an oxygen-containing gas, preferably air, under controlled temperature conditions. The ratio of stripping gas to solvent depends on the size of the column and the $H_2S$ content of the solvent, but is preferably at least about 0.2 s.c.f. per pound of solvent.

While the principal effect of the stripping gas is to remove the $H_2S$ by a physical sweeping action, the last traces of $H_2S$ are oxidized. Accordingly, it is necessary to conduct the stripping step under conditions such that the solvent will be at least the minimum temperature to effect oxidation of the $H_2S$. The preferred method of effecting this result is to preheat the solvent. Prior to entering the stripping column, the $H_2S$ containing solvent is heated to a temperature sufficiently high so that it will still be at a temperature of at least 104° F. preferably 113° to 140° F. when it reaches the base of the stripper. The temperature to which the solvent is heated depends upon the size and design of the stripper and the flow rates of stripping gas and solvent. The temperature of the preheated solvent entering the stripping column should be at least about 110° F. and should not exceed about 210° F. Of course, the stripping gas can also be preheated to help attain the oxidation temperature.

Generally, the absorption zone comprises a plate absorption column of at least 15, preferably at least 30 actual trays, into the bottom of which the gaseous mixture is introduced for countercurrent contact with the solvent introduced at the top of the column. Similarly, the stripping zone comprises a packed or plate stripping column, into the top of which solvent containing absorbed gas is introduced and in which such absorbed gas is separated from the solvent by the combined effect of the pressure reduction, heat supplied to the solvent and stripping gas present in the column.

In the accompanying drawing, FIGURE 1 is a diagrammatic flow sheet illustrating one method of practicing the present invention.

Gas, for example, a sour natural gas, containing hydrogen sulfide and $CO_2$ in a mol ratio of $H_2S$ to $CO_2$ between 0.1 and 10 enters through line 1 at the bottom of an absorption column 2 and passes through at a rate of 10 to 72 s.c.f./(minute)(sq. ft.), cross sectional area. A gas flow in the range of 30 to 50 s.c.f./(minute) (sq. ft.) is preferred. Cooled DMPEG solvent is fed through line 4 to the top tray 3 at a rate of 0.6 to 7.3 gallons/(minute) (sq. ft.) with the preferable range being 2 to 5 gallons/(minute) (sq. ft.) The solvent is recycled material and weighs about 8.4 lbs./gal. The incoming solvent temperature is about 32° to 105° F., with 40° to 60° F. preferred. The column is preferably operated at pressures in the range 150 to 1500 p.s.i.a. The hydrogen sulfide-rich solvent leaving the bottom of the absorber through line 6 is at a temperature of about 33° to 110° F., preferably 60° to 95° F., and contains 2 to 20%, by weight, $H_2S$. The gas effluent leaving through line 5 from the top of the absorber will contain 0.01 to 10 p.p.m., by volume, $H_2S$ and up to 90% or more of the $CO_2$ fed to the column.

The $H_2S$ rich solvent flashed in flash tank 7 operating at a pressure lower than in the absorber, usually 15 to 500 p.s.i.a., preferably about 65 p.s.i.a. Solvent temperature here is in the range of 33° to 110° F. with 50° to 80° F. preferred. Gas from the flashing operation containing process gas, including substantially all of the $CO_2$ which may have been absorbed in the absorber, and inerts which is recycled to the absorber. Over 75% of the hydrogen sulfide remains in the effluent solvent passing through line 9. The solvent then passes from the flash tank through the tube side of a heat interchanger 10 for heat conservation and then to heat exchanger 11 where the solvent is warmed by low-pressure steam. Warmed solvent undergoes pressure reduction as it is injected into the gas disengaging section 12 of a stripper 13, which may be a packed column (usually at least 20 ft. of packing depth) operated at 2 to 18 p.s.i.a. pressure, with 15 to 18 p.s.i.a. preferred. Solvent flows downward through the stripper 13 and cools as dissolved gases are desorbed. Solvent temperature at the base of the stripper should be at least 104° F., with the range of 113° to 140° F. being preferred. Air fed into the base of the stripper at 2–20 s.c.f./(minute) (sq. ft.) passes upward countercurrent to the down-flowing solvent. In the lower portion of the stripper atmospheric oxygen tends to oxidize final traces of hydrogen sulfide so that emerging solvent is exceedingly lean in concentration of $H_2S$ and other sulfur compounds. As the stripping air continues upward, the effect of the air is increasingly to physically sweep hydrogen sulfide and other acid gases from the solvent so that the effluent gas leaving the stripper via line 14 contains up to 90 volume percent $H_2S$. This gas is cooled in a partial condenser 15 to prevent evaporation losses of solvent. Condensate is returned via line 16 to the top of the packed section of the stripper. Cooled effluent gas containing $H_2S$ and air may be delivered via line 17 to a subsequent processing step for sulfur recovery or disposal.

Stripped, warm solvent is then passed via line 18 through the jacket side of the interchanger 10 and then through a cooler 19, where it is cooled by a refrigerating unit to 32° to 105° F., with 40° to 60° F. preferred. The solvent is then returned to the absorber via line 4 for another cycle.

The advantages of the present invention are achieved in the greatest measure when the mol ratio of $H_2S$ to $CO_2$ is in the range 0.1 to 10.

*Example I*

Natural gas containing 25% by volume $H_2S$ and 10% by volume $CO_2$ enters the bottom of a 40-tray absorption column 2 having a cross section of 0.196 sq. ft. at a rate of 8.97 s.c.f. per minute (s.c.f.m.) via line 1. Recycled DMPEG solvent containing essentially no $H_2S$ or $CO_2$ enters the top of the column at 2.48 pounds/minute rate via line 4. The column is operated at 515 p.s.i.a. and with solvent temperatures of 44.5° F. at the inlet and 91.5° F. at the exit. The effluent solvent contains 7.8 wt. percent $H_2S$ and 1.76 wt. percent $CO_2$. Effluent gas from the top of the absorber contains 1 p.p.m., by volume, $H_2S$ and 8.3 volume percent $CO_2$. The solvent is then flashed in flash tank 7 at 65 p.s.i.a. and 62.5° F. Desorbed gas may be recycled to the absorber via line 8. The solvent is advanced via line 9 through a heat interchanger 10 where temperature of the solvent is increased to 108° F. by hot solvent exit the stripper passing through the shell side of the heat interchanger. Warmed solvent exit the interchanger then passes through a steam-heated heat exchanger 11 to provide heat for vaporization of dissolved gases. The heated gas-liquid mixture is passed at 190° F. into the gas disengaging section 12 of the stripper 13, which is a baffled cylindrical vessel, 18 inches in diameter and 30 inches tall. The packed section of the stripper 13 is a column having a cross-sectional area of 0.114 sq. ft., containing 20 feet of ⅜ inch Intalox packing. Solvent passes down through the packed section and countercurrently contacts air, which passes up through the stripper at 0.50 s.c.f.m. The desorbed gas and stripping air emerge from the top of the stripper via line 14, and pass through a partial condenser 15, which cools the gas to 86° F. and condenses solvent vapor, which is returned to the top of the stripper. The cooled gas exiting via line 17 is largely hydrogen sulfide. The lean solvent from the bottom of the stripper at 122° F. passes via line 18 through the shell side of heat interchanger 10, where it is cooled to 75° F. Further cooling of the solvent to 44.5° F. is effected by passage through cooler 19 which is cooled by a refrigeration unit. Cooled solvent is then injected into the absorber to start the cycle again.

*Example II*

The following is a specific example of the process when used to scrub a hydrocarbon gas containing large concentrations of $H_2S$ and $CO_2$ so that $H_2S$ may be recovered at one point in the process while simultaneously recovering $CO_2$ from another point in the process.

Referring to FIGURE 2, there is shown an absorber column 30 having a cross-section of 0.196 sq. ft. and divided into two sections with the $H_2S$ absorption section 31 at the bottom and the $CO_2$ absorption section 32 at the top. Natural gas containing 25 volume percent $H_2S$ and 10% $CO_2$ is fed at the rate of 8.97 standard cubic feet per minute (s.c.f.m.) into the lower region of the $H_2S$ absorption section where it countercurrently contacts DMPEG solvent at 515 p.s.i.a. total pressure entering through line 43 at 2.55 pounds/minute. On emerging from the $H_2S$ absorption section through line 33, the gas contains less than 1 p.p.m. by volume $H_2S$ and 10.7 volume percent $CO_2$. This gas then passes into the $CO_2$ absorption section 32 where it countercurrently contacts DMPEG solvent at 515 p.s.i.a. coming down through the column at 2.95 pounds/minute. Gas emerges from the top of the column through line 34 containing 0.5 volume percent $CO_2$ and less than 1 p.p.m. $H_2S$ by volume. Stripped, lean solvent at 40° F. is injected through line 35 into the upper region of the $CO_2$ absorption section at the rate of 2.95 pounds/minute, where it absorbs $CO_2$ from the gas passing upward. The $CO_2$ rich solvent at 50° F. emerges from the $CO_2$ absorption section through line 36 containing 2.56 wt. percent $CO_2$ and passes into the $CO_2$ flash vessel 37 at 17 p.s.i.a. where $CO_2$ is released through line 38 for recovery. A portion of the solvent leaving the $CO_2$ flash vessel via line 39 is bled off through line 39A to rejoin the solvent stream at junction 40 at such a rate that solvent will advance through line 39 to the refrigerated cooler 41 at a rate of 2.55 pounds/minute. After being cooled to 40° F. the solvent is pumped by injection pump 42 through line 43 into the top region of the $H_2S$ absorption column, where it absorbs $H_2S$ from the gas flowing up through the column. The $H_2S$-rich solvent emerges from the column through line 44 at a temperature of 92° F., containing 7.6 wt. percent $H_2S$ and 1.76 wt. percent $CO_2$. It passes into the intermediate flash tank 45 at 65 p.s.i.a. where hydrocarbons, carbon dioxide and some $H_2S$ are released from solution and vented through line 46. $H_2S$ rich solvent flows from the intermediate flash tank via line 45A and joins bypass solvent at junction 40. Combined solvent passes through the tube side of heat interchanger 47, and then via line 48 through a steam-heated heat exchanger 49 which provides heat for vaporization of dissolved gases. Heated solvent enters the top of the stripper column 51 via line 50 at 16 p.s.i.a. and flows downward, countercurrently contacting air which is injected through line 52 into the stripper at 0.625 s.c.f.m. Effluent gas from the top of the stripper passes through a water-cooled condenser 53 and emerges through line 54 at a rate of 2.46 s.c.f.m. and 86° F. containing 68 volume percent $H_2S$, 4.6 volume percent $CO_2$, and 1.8 volume percent natural gas for transmission to sulfur recovery. Lean solvent passes out of the bottom of the stripper at 122° F., containing essentially no $H_2S$ or $CO_2$. It flows via line 55 through the shell side of the heat exchanger 47, through a refrigerated cooler 56, where it is cooled to 40° F., and then is pumped by injection pump 57 via line 35 into the $CO_2$ absorption section of the absorber column to start the cycle again.

Conditions in the $CO_2$ absorption column can vary. Preferably, the solvent temperature is between about 30° and 100° F. and pressure is superatmospheric. The solvent: gas ratio is not critical here, but should be sufficient to effect absorption of a substantial portion of the $CO_2$.

In the process of this invention, a portion of the $CO_2$ content of the feed gas is absorbed in the $H_2S$ absorber. This portion varies with the solvent:$CO_2$:$H_2S$ ratio, but is preferably less than 50%.

We claim:
1. A process for removing hydrogen sulfide and carbon dioxide from a gaseous mixture containing hydrogen sulfide and carbon dioxide which comprises (a) contacting said gaseous mixture in a first zone with 0.1 to 1.8 pounds of liquid solvent per standard cubic foot of hydrogen sulfide to be absorbed, the liquid solvent comprising a normally liquid dialkyl ether of a polyalkylene glycol, to effect absorption of substantially all of the H₂S and a minor portion of other gases; (b) passing the solvent containing the absorbed hydrogen sulfide to a second zone maintained at a pressure substantially lower than that in the absorption zone to effect liberation of the other gases; (c) withdrawing from said second zone gases liberated therein; (d) withdrawing solvent containing H₂S from said second zone; (e) passing an oxygen-containing gas in contact with the solvent in a stripping zone which is maintained under conditions such that the solvent will be at least 104° F. when it reaches the base of the stripping zone, to effect removal of substantially all of the hydrogen sulfide therefrom; (f) introducing the desorbed solvent to a third zone for contact with carbon dioxide containing gas from said first zone so as to absorb carbon dioxide therefrom; and (g) returning desorbed solvent after having CO₂ removed therefrom to the absorption zone for further contact with the gaseous mixture.

2. The process of claim 1 wherein the liquid solvent is selected from the group consisting of the dimethyl ether of triethylene glycol, the dimethyl ether of tetraethylene glycol, the dimethyl ether of pentaethylene glycol, the dimethyl ether of hexaethylene glycol, and the dimethyl ether of heptaethylene glycol.

3. The process of claim 2 wherein the solvent is the dimethyl ether of tetraethylene glycol.

4. The process of claim 1 wherein the gaseous mixture is sour natural gas.

5. The process of claim 1 wherein oxygen-containing gas is air.

6. The process of claim 1 wherein the solvent enters the stripping zone at a temperature in the range 110 to 210° F.

7. The process of claim 1 wherein the ratio of oxygen-containing gas to solvent in the stripping zone does not exceed about 1.0 standard cubic foot gas per pound of solvent.

8. A process for selectively removing hydrogen sulfide and carbon dioxide from a gaseous mixture which comprises (a) contacting said gaseous mixture in a first absorption zone with 0.1 to 1.8 pounds of liquid solvent per standard cubic foot of hydrogen sulfide to be absorbed, the liquid solvent comprising a normally liquid dialkyl ether of a polyalkylene glycol, to effect absorption of substantially all of the H₂S and a minor portion of other gases; (b) passing the solvent containing the absorbed hydrogen sulfide to a first evaporation zone maintained at a pressure substantially lower than that in the first absorption zone to effect liberation of the other gases; (c) withdrawing from said evaporation zone gases liberated therein; (d) withdrawing solvent containing H₂S from said first evaporation zone; (e) passing an oxygen-containing gas in contact with the solvent in a stripping zone which is maintained under conditions such that the solvent will be at least 104° F. when it reaches the base of the stripping zone, to effect removal of substantially all of the hydrogen sulfide therefrom; (f) introducing the desorbed solvent to a second absorption zone for contact with carbon dioxide-containing gas from said first absorption zone to effect absorption of the carbon dioxide; (g) passing the solvent containing absorbed CO₂ to a second evaporation zone to effect liberation of the CO₂; (h) withdrawing CO₂ from said second evaporation zone; (i) withdrawing solvent from said second evaporation zone and passing it to said first absorption zone for contact with the gaseous mixture.

9. The process of claim 8 wherein a portion of the solvent from the second evaporation zone is combined with the solvent from the first evaporation zone and contacted with an oxygen-containing gas.

References Cited

UNITED STATES PATENTS

| | | | |
|---|---|---|---|
| 2,781,863 | 2/1957 | Block et al. | 55—73 X |
| 3,242,646 | 3/1966 | Miller et al. | 55—73 X |

FOREIGN PATENTS

| | | |
|---|---|---|
| 951,417 | 3/1964 | Great Britain. |

REUBEN FRIEDMAN, *Primary Examiner.*

R. W. BURKS, *Assistant Examiner.*